UNITED STATES PATENT OFFICE.

THOMAS BLISS STILLMAN, OF HOBOKEN, NEW JERSEY, AND ALBERT H. KOEFOED, OF NEW YORK, N. Y.

METHOD OF TREATING PHOSPHATES FOR FERTILIZERS.

SPECIFICATION forming part of Letters Patent No. 305,249, dated September 16, 1884.

Application filed January 15, 1884. (No specimens.)

*To all whom it may concern:*

Be it known that we, THOMAS B. STILLMAN, a citizen of the United States, residing at Hoboken, in the county of Hudson and State of New Jersey, and ALBERT H. KOEFOED, a citizen of the United States, residing at New York, in the county and State of New York, have invented new and useful Improvements in the Method of Treating Phosphates of Iron and Alumina, of which the following is a specification.

This invention relates to an improvement on the method of treating phosphates of iron and alumina which is described in Letters Patent No. 281,635, granted to us July 17, 1883, such improvement being pointed out in the following specification.

The difficulty heretofore experienced in producing soluble or available phosphoric acid from the insoluble phosphates of iron and alumina consists in the fact that after the phosphatic rock has been subjected to the treatment with sulphuric acid, as usually practiced in making superphosphates, the phosphoric acid, or a large proportion of it, is rendered soluble for a few hours only, and then it gradually reverts to its insoluble condition, whereby it becomes useless as a fertilizer. All the processes so far practiced, as far as we know, fail to prevent this reversion of the phosphoric acid. This reversion is due to the presence of the oxides of iron and alumina, which are gradually attacked by the phosphoric acid, so as to form insoluble phosphates of iron and alumina; and the principal object of our present improvement is to act upon the oxides of iron and alumina in such a manner that the reversion of the phosphoric acid to the insoluble condition is prevented. In the method of treating phosphates of iron and alumina described in our Patent No. 281,635, above mentioned, we endeavored to produce the result above stated; but though we succeeded in producing a partially-satisfactory product in a crucible of the capacity of a few pounds, we found that on a large scale the substances used as indicated in that patent will not produce a superphosphate which will not revert. On making tests upon five-hundred-pound lots, as directed in said Patent No. 281,635, we succeeded in making a soluble superphosphate, which, however, in a very short time reverted to the insoluble condition. Such experiments, in fact, demonstrated that a mixture of powdered dolomite or limestone with powdered phosphatic rock does not produce the desired result, for if the roasting takes place in a reverberatory furnace the powdered material forms a solid mass upon the bottom of the furnace, preventing the circulation of the air through the same, so as to prevent a chemical change, with the exception of a thin layer of the depth of one-eighth or one-quarter of an inch on the top of the mixture. The powdered mixture cannot be stirred at all in the furnace to produce chemical action throughout the mass, since, when a forcible blast is used, the powder blows up the chimney, and the mass, instead of turning over, simply runs with the stirrer like flour. In other words, the phosphatic rock and dolomite cannot be used in a powdered condition, as no chemical action practically takes place. After a series of experiments we have found that a good result is obtained by taking the phosphatic rock and also the dolomite or limestone broken up in pieces, but not powdered, the pieces of rock and dolomite best suited for our purpose being about nut size, or of any size which will allow the air and gases of the furnace to circulate through the mass. The proportion in which we employ the dolomite or limestone is from ten to thirty per cent. of the phosphate rock, and we have found that by reducing the quantity of dolomite or limestone to this percentage (heretofore we used seventy-five per cent.) the gases and air in the furnace have a better chance to oxidize the iron and alumina to the insoluble oxides; but we also obtain a higher percentage of phosphoric acid in the product. Where a furnace is employed which allows the use of carbon as a mixture with the phosphatic rock and dolomite or limestone, we have found the proportion of carbon necessary to vary from five to twenty per cent. After the mass has been roasted it is allowed to cool, and then it is finely pulverized, and the pulverized mixture is exposed to the action of sulphuric acid, to form superphosphates, and to set free the phosphoric acid. In place of sulphuric acid, any acid may be employed—as, for example, muriatic acid. If we desire to form a concentrated product rich in phosphoric acid, water is added, either hot or cold. The soluble portions are filtered off and the water in the filtrate is driven off by heat, and the residuum, after drying, will be found to be very rich in phosphoric acid, and, being in the form of a dry powder, it can be added directly to any fertilizer and distributed by drills, or it can be packed up for the market without further treatment. The soluble superphosphate and free phosphoric acid contained in this product are not liable to revert into their insoluble condition.

We herein expressly disclaim the method of treating insoluble phosphates described and claimed in the patent granted to us July 17, 1883, No. 281,635.

What we claim as new, and desire to secure by Letters Patent, is—

1. The method of treating phosphate rocks containing insoluble phosphates, by breaking up such rocks into pieces, mixing these pieces with dolomite or limestone, also broken up into pieces, then roasting the mixture, pulverizing the roasted mass, and, finally, treating the same with a mineral acid, substantially as and for the purpose set forth.

2. The method of treating phosphate rocks containing insoluble phosphates, by breaking up such rocks into pieces, mixing these pieces with dolomite or limestone, also broken up into pieces, then roasting the mixture, pulverizing the roasted mass, treating the pulverized mass with a mineral acid and with water, filtering the same, and, finally, evaporating the water from the filtrate and drying the residue, substantially as set forth.

In testimony whereof we have hereunto set our hands and seals in the presence of two subscribing witnesses.

THOMAS BLISS STILLMAN. [L. S.]
ALBERT H. KOEFOED. [L. S.]

Witnesses:
W. HAUFF,
E. F. KASTENHUBER.